US006932052B1

(12) United States Patent
Fulton

(10) Patent No.: US 6,932,052 B1
(45) Date of Patent: Aug. 23, 2005

(54) AIR/FUEL RATIO CONTROL SYSTEM FOR GASEOUS FUELED ENGINES

(75) Inventor: Justin L. Fulton, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 10/950,333

(22) Filed: Sep. 24, 2004

(51) Int. Cl.$^7$ .............................................. F02M 7/00
(52) U.S. Cl. ........................ 123/344; 123/434; 123/679
(58) Field of Search ................................. 123/679, 344, 123/434, 704, 439, 437, 444, 453, 457, 525

(56) References Cited

U.S. PATENT DOCUMENTS

| | | | | |
|---|---|---|---|---|
| 5,245,977 A | * | 9/1993 | Chen et al. | .................. 123/590 |
| 5,797,379 A | * | 8/1998 | Sharples | ..................... 123/527 |
| 6,752,135 B2 | * | 6/2004 | McLaughlin et al. | ....... 123/688 |

* cited by examiner

Primary Examiner—Bibhu Mohanty
(74) Attorney, Agent, or Firm—Reinhart Boerner Van Deuren P.C.

(57) ABSTRACT

The invention provides a system that controls the air intake pressure of a venturi mixer in an air/fuel ratio control system for gaseous fueled engines to match the fuel vaporizer/regulator output pressure (negative pressure) or to a desired set point of a fuel vaporizer/regulator connected to the fuel inlet of the venturi mixer. A differential pressure control valve in the air intake upstream of the venturi is used, which results in negative pressure vaporizer/regulators being compatible with the constant air/fuel ratio fluidic control principle of the venturi mixer. A differential pressure sensor or estimated differential pressure based on airflow and valve position is used in one embodiment to control the venturi intake air pressure to the desired set point. The set point may be zero or biased by an outer control loop of an engine controller.

22 Claims, 2 Drawing Sheets

AIR/FUEL RATIO CONTROL SYSTEM FOR GASEOUS FUELED ENGINES

FIELD OF THE INVENTION

This invention pertains to air/fuel ratio control systems for gaseous systems, and more particularly to air/fuel ratio control systems for gaseous systems using a venturi mixer.

BACKGROUND OF THE INVENTION

The overall performance of an engine in terms of combustion efficiency, speed control, exhaust emission of pollutants and others, greatly depends on controlling the mixing of the air and fuel into an appropriate ratio for combustion and on regulating the flow of this mixture into the combustion part of the engine. Precise and reliable control of the combustion is very important for the efficiency and the safety of the combustion process, as is well understood by those skilled in the art. For example, it is well known that combusting a fuel with excess oxidant yields higher nitrogen oxides ($NO_x$) emission rates. Combustion of a fuel with an uncontrolled excess amount of air can also lead to excessive fuel consumption and increase the production cost of the final product. On the other hand, incomplete combustion of a fuel generates carbon monoxide (CO).

$NO_x$, CO and hydrocarbon (HC) emissions are regulated by the government to increasingly lower levels and in an ever increasing number of industries. In addition to the $NO_x$, CO and HC emissions, many designs must meet the requirements of regulatory agencies that have adopted the standards published by governments, insurers, and industry organizations (such as UL, CSA, FMRC, etc.). These concerns relative to fuel supplies and air quality have led government agencies to reducing the amount of allowed emissions in gaseous fueled engines in an effort to reduce pollution in the environment. More restrictive emissions limits are being issued by governments. For example, emissions limits have been set for the first time in 2004 on engines used in forklifts and other nonroad vehicles such as airport ground-service equipment, off-highway motorcycles, all-terrain vehicles, snowmobiles, and recreational marine diesel engines. The rule will require that nitrogen oxides (NOx) emissions reductions from large industrial spark engines be implemented in two stages. Initial reductions are required in 2004 with greater reductions required in 2007.

One approach to aid in meeting the emission requirements is to use cleaner burning fuels. For example, propane is clean burning, non toxic, and produces fewer greenhouse gases (carbon monoxide, hydrocarbons and $NO_x$) than gasoline or diesel fuel. In systems using propane, it is critical to control the flow of air and gaseous fuel such that an optimum fuel-air mixture is maintained at all times during operation of the engines. Normal operating conditions for spark ignited engines such as forklifts and other vehicles include fast transients on speed and power output, pronounced swings in air and/or fuel temperatures, and variations in fuel composition, all of which increase the difficulty of maintaining fuel-air mixtures within desired tolerances.

Mixers are used to meter the gas flow rate according to the air flow rate such that the two flow rates are maintained in proportion as the flow rates change. There are essentially two known types of mixers designed to achieve proportioned flow rates. The first type utilizes a pressure differential across an orifice, or a nozzle, in the air stream to induce gas flow, or to control an orifice size in the gas stream. The second type of mixer involves measurement of air flow rate, determining the required gas flow, and controlling a fuel injector to deliver the desired fuel flow.

Mixers of the first type employ pressure differential in the air stream to control gas flow and achieve the objective of maintaining a constant fuel-air ratio in a number of ways. For example, the air-valve type, used for many years in industrial gas engines, applies a pressure differential generated by air flow on a diaphragm to modulate a gas valve. Disadvantages to this type of mixer are the diaphragm is always in motion when engine power is varied continuously, causing wear and consequently affecting the reliability of the mixer. Additionally, the fuel-air flow ratio is affected by a number of operational parameters, making it difficult to obtain a constant fuel-air ratio over a wide range of engine power. Such disadvantages have not been important factors in industrial gas engines which operate at steady power for a majority of the time, but have a pronounced detrimental effect on emissions when applied to vehicular engines.

Another mixer of the first type is the venturi mixer, which utilizes Bernoulli's law to induce gas flow into the throat of a venturi in which there is air flow. The rate of gas flow is proportional to the rate of air flow and, in theory, remains so as long as the supply pressures of air and gas are equal and the temperatures of the air and gas remain constant. A venturi mixer insures maximum performance, through mixing of the air and gas, and proportioning of the air and gas within limits. The air is generally at atmospheric pressure, which requires the fuel flow to also be at atmospheric pressure for the venturi mixer to work. Typically, a zero pressure fuel regulator (i.e., a zero governor) cancels variations in the gas line pressure and reduces it to atmospheric, thus allowing the venturi mixer to entrain gas in constant ratio to the amount of air passing through. The zero governor works on the suction principal: air flowing through a venturi mixer creates suction in the gas line that opens the zero governor, thereby allowing gas to flow.

Due to a variety of technical and safety-related issues, it is difficult, in practice, to provide a zero pressure fuel delivery to the venturi mixer for applications such as mobile applications. For example, most propane-fueled, mobile industrial equipment in use today utilizes a negative pressure vaporizer/regulator for final fuel delivery pressure control. This device typically regulates the liquid propane withdrawn from the storage tank down to a final output pressure in the range of –0.5 to –1.5 inches of water relative to a reference pressure port. The negative pressure output only slightly affects the mechanical air/fuel ratio control behavior of an air-valve mixer. However, the use of venturi mixer is usually impractical in systems with a negative pressure regulator output.

BRIEF SUMMARY OF THE INVENTION

The invention provides a system that controls the venturi intake air pressure to match the vaporizer/regulator output pressure, thereby maintaining a constant air/fuel ratio. The system uses a differential pressure control loop to control a valve in the air intake upstream of the venturi to control the venturi intake air pressure to control the intake air pressure to the desired level to maintain the desired air/fuel ratio via the fluidic properties of the venturi mixer. The invention allows systems having negative fuel pressure outputs to use the benefits of fixed venturi mixer systems.

The differential pressure control loop uses a differential pressure sensor in one embodiment for control of the valve. The valve position is adjusted based upon the pressure differential between the venturi air intake pressure and the venturi fuel intake pressure. Alternatively, the differential pressure may be estimated based on the airflow and valve position.

In another embodiment, the differential pressure set point is biased by other control loops for other functions, such as a closed loop air/fuel ratio control based on a control parameter such as exhaust oxygen and the like. In this embodiment, the differential pressure or valve position set point is controlled by an air/fuel controller that receives the control parameter and adjusts the set point based upon a model of the system, via a look-up table, a feedforward control loop, etc.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a system that controls the venturi intake air pressure of an air/fuel ratio control system for gaseous fueled engines to match the vaporizer/regulator output pressure or to a desired set point. A differential pressure control valve in the air intake upstream of the venturi is used, which results in negative pressure vaporizer/regulators being compatible with the constant air/fuel ratio fluidic control principle of the venturi mixer. A differential pressure sensor or estimated differential pressure based on airflow and valve position is used in one embodiment to precisely control the venturi intake air pressure to the desired set point.

The system has several advantageous characteristics. One advantage is that the control valve is exposed to only a filtered air stream instead of fuel or an air/fuel mixture, either of which can be dirty or corrosive leading to a reduction in reliability. The differential pressure or valve position set point can be biased by another control loop for other functions. For example, one function is a closed-loop air/fuel ratio control based on exhaust oxygen sensor feedback. An air/fuel ratio control loop uses the oxygen sensor as an input to control the valve set point to achieve a desired oxygen content of the engine exhaust.

Figure 1:
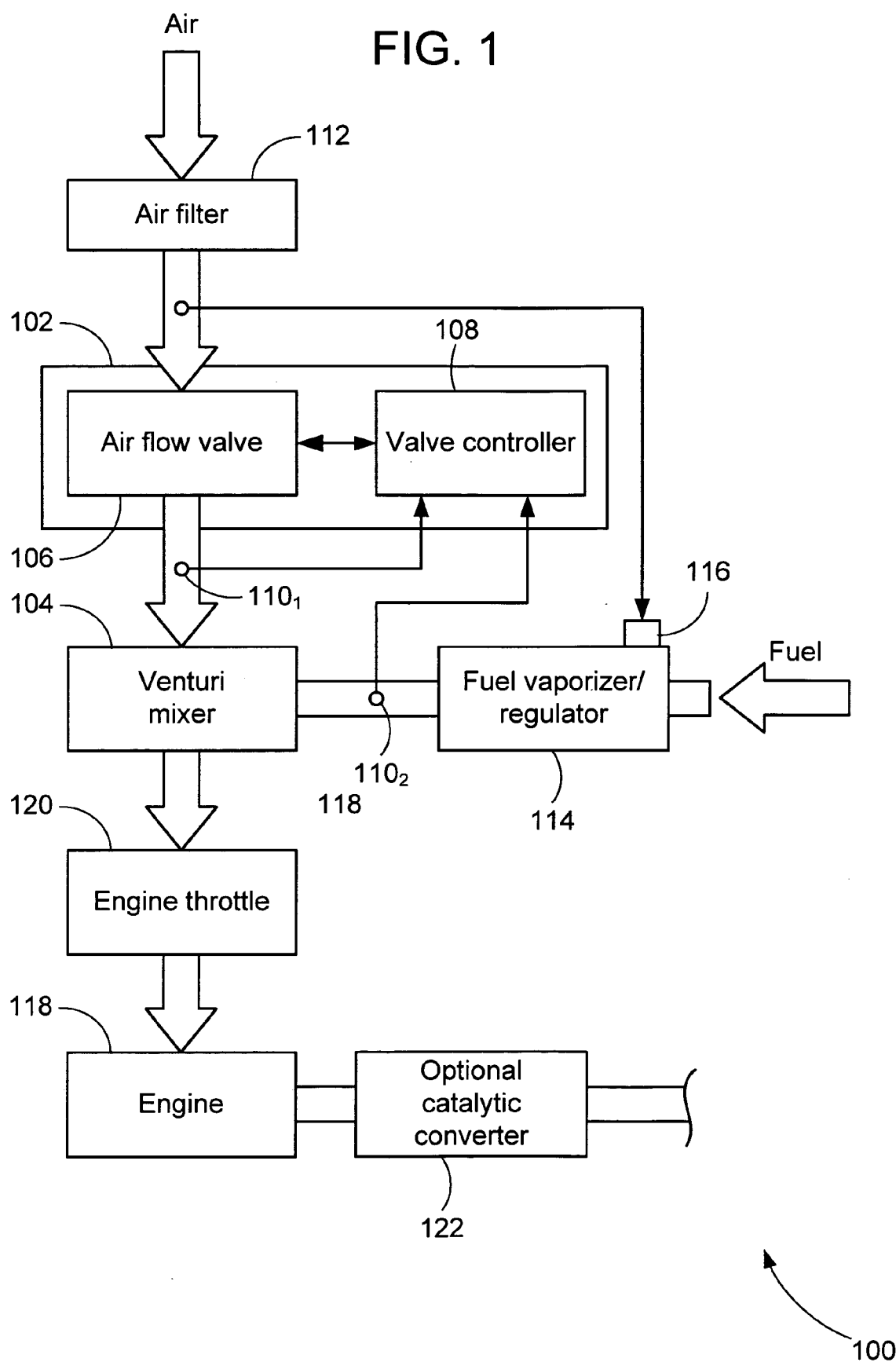
FIG. 1 is a block diagram view of a differential pressure control valve module in accordance with the present invention installed as a component within an air/fuel supply in accordance with the teachings of the invention.

Turning to the drawings, wherein like reference numerals refer to like elements, the invention is illustrated as being implemented in a suitable engine environment. FIG. 1 illustrates an example of the invention used in mobile industrial equipment applications such as a forklift. The engine environment 100 includes control valve module 102 and venturi mixer 104. The control valve module 102 incorporates a valve 106 having an integrated actuator and an electronics module 108 suitable to receive a signal from pressure sensors 110₁, 110₂. The signals are processed by the electronics module 108 to actuate the valve 106 to control the combustion mixture to a precise ratio such as maintaining a stoichiometric ratio.

During operation, air flows through air filter 112 through the valve 106 to the venturi mixer 104. The fuel from a pressurized fuel supply flows through fuel vaporizer/regulator 114 to the venturi mixer 104. The fuel vaporizer/regulator 114 typically regulates the fuel (e.g., liquid propane) withdrawn from the fuel supply (e.g., propane storage tank) down to a final output pressure in the range of −0.5 to −1.5 inches of water relative to the pressure at a reference pressure port 116 of the fuel vaporizer/regulator 114. The reference pressure is set to the air pressure at the output of the air filter 112. The relative pressure of the air flowing to the venturi mixer 104 is controlled by control valve module 102. The venturi mixer 104 mixes the air with fuel and the resulting air/fuel mixture is sent to the engine 118 via throttle 120 for ignition as is known in the art. The engine exhaust flows through optional catalytic converter 122. It should be noted that the catalytic converter 122 is not needed for many applications. In an open loop configuration, the electronics module 108 senses the venturi inlet fuel pressure from sensor 110₂ and the venturi inlet air pressure from sensor 110₁ and adjusts the position of the valve 106 such that the venturi inlet air pressure matches the venturi inlet fuel pressure (i.e., the fuel vaporizer/regulator outlet pressure) or that the differential pressure is within tolerance of a set point.

Figure 2:
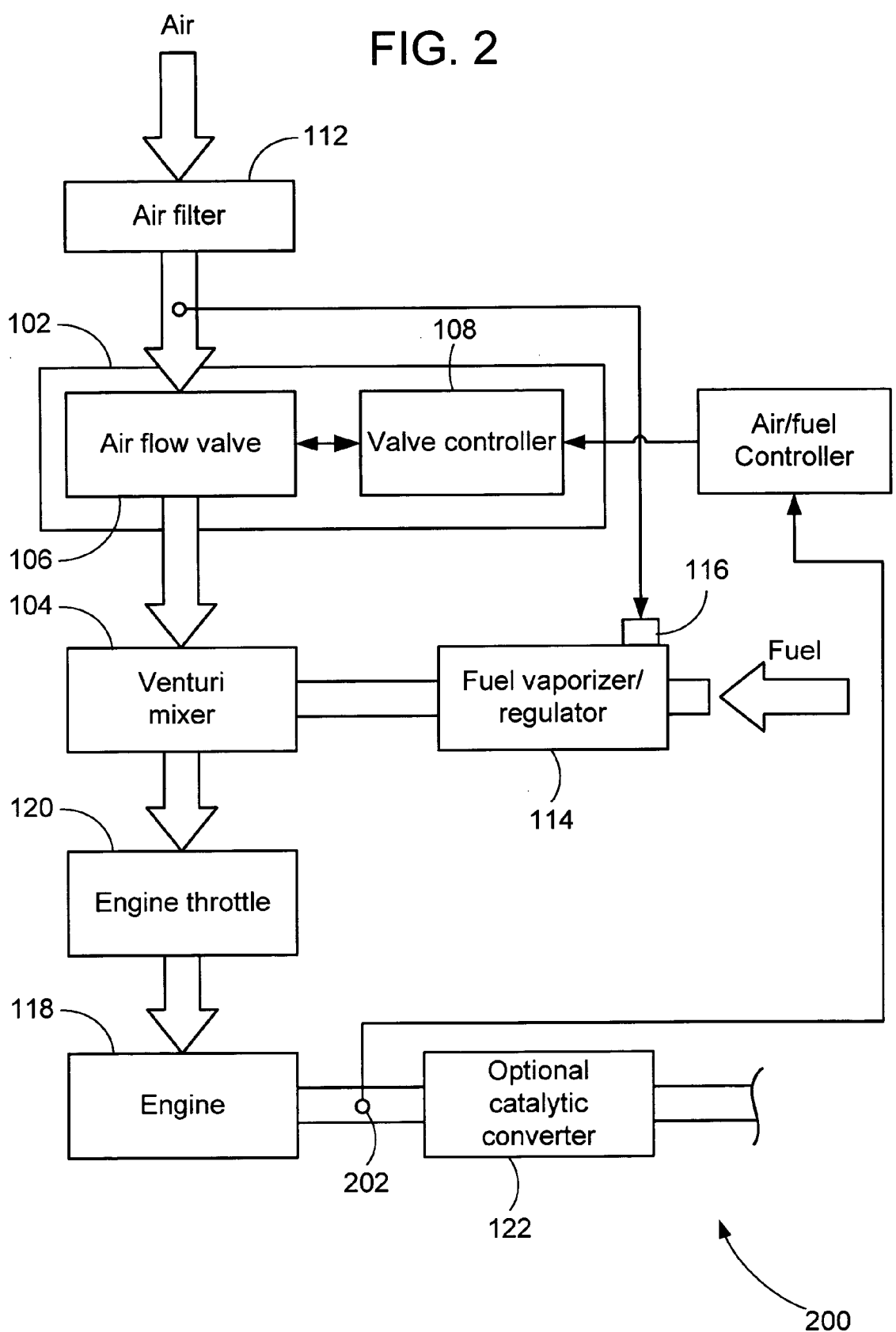
FIG. 2 is a block diagram view of the differential pressure control valve module of FIG. 1 in a closed-loop air/fuel control system.

Turning now to FIG. 2, an example of the invention used in a closed loop system is illustrated. The engine environment 200 includes control valve module 102, venturi mixer 104, fuel vaporizer/regulator 114, engine 116, engine throttle 118, a heated exhaust gas oxygen (HEGO) sensor 202 located in the engine exhaust, air/fuel controller 204, and optional catalytic converter 122. In this embodiment, control valve module 102 controls the venturi inlet air pressure to maintain the desired oxygen content.

During operation, air flows through air filter 112 through the valve 106 to the venturi mixer 104. The fuel from the fuel tank flows through fuel vaporizer/regulator 114 to the venturi mixer 104. The relative pressure of the air flowing to the venturi mixer 104 is controlled by control valve module 102 based on a set point provided by air/fuel controller 204. As previously described, the venturi mixer 104 mixes the air with fuel and the resulting air/fuel mixture is sent to the engine 114 via throttle 118 for ignition as is known in the art. The exhaust gas from ignition flows through the optional catalytic converter 206 to the atmosphere. HEGO sensor 202 is located in the exhaust before the optional converter 206 and operates as a reference-gas sensor. It compares the residual oxygen in the exhaust gas with oxygen in the reference atmosphere (air circulating inside the sensor). The HEGO sensor voltage output signal provides an indication of the fuel/air ratio. The air/fuel controller 204 receives the HEGO sensor voltage output and determines the pressure or position set point. Generally, the air/fuel ratio controller 204 adjusts the pressure or position set point such that the HEGO sensor voltage error (i.e., the difference between a target HEGO voltage and the HEGO sensor voltage) is zero and the valve 106 is moved only to try to maintain the HEGO sensor voltage at the target voltage. Note that a feedforward control loop may be needed to account for the time lag between changing the valve position and detecting a change in the HEGO sensor. The target voltage may be derived via a model of the engine or via a lookup table that is based upon engine operating conditions.

Note that the fuel vaporizer/regulator output pressure does not have to be very stable or repeatable because the differential pressure control valve will compensate. The compensation allows the system to be used in mobile applications where the output pressure changes due to movement (e.g., vibration), wear and tear, etc. Additionally, the transient response of the system during increasing air flow (acceleration) will tend towards richer air/fuel ratios, while decreasing air flow (deceleration) will tend to be slightly leaner than the steady-state air/fuel ratio. This characteristic is desirable for good engine response and this effect is tunable by changing the responsiveness of the differential control valve relative to the engine throttle.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control system for controlling an air/fuel ratio in gaseous-fueled engine comprising:
    a valve having an outlet port in fluidic communication with an air inlet of a fixed venturi mixer;
    a fuel vaporizer/regulator having an outlet port in communication with a fuel inlet of the fixed venturi mixer; and
    a control module in communication with the actuator, the control module adapted to perform the steps comprising:
        determining a differential pressure between an outlet pressure of the fuel vaporizer/regulator and an outlet pressure of the valve; and
        moving the valve to a position such that the differential pressure is within a tolerance band of a set point.

2. The control system of claim 1 wherein the fuel vaporizer/regulator comprises a negative outlet pressure fuel vaporizer/regulator.

3. The control system of claim 1 further comprising an air filter in fluidic communication with the valve.

4. The control system of claim 1 further comprising a differential pressure sensor and wherein the step of determining a differential pressure between the outlet pressure of the fuel vaporizer/regulator and the outlet pressure of the valve comprises the step of receiving a differential pressure signal from the differential pressure sensor.

5. The control system of claim 1 wherein the step of determining a differential pressure between the outlet pressure of the fuel vaporizer/regulator and the outlet pressure of the valve-comprises the step of estimating the differential pressure based on airflow and the position of the valve.

6. The control system of claim 1 wherein the set point is zero.

7. The control system of claim 1 wherein the set point is biased by an output of an outer control loop.

8. The control system of claim 7 wherein the outer control loop is a closed loop air/fuel ratio control based on an exhaust gas oxygen sensor output.

9. The control system of claim 8 wherein the air/fuel ratio control is further based on a model of the control system.

10. The control system of claim 8 further comprising a lookup table having a plurality of set points corresponding to engine operating parameters and the exhaust gas oxygen sensor output and wherein the air/fuel ratio control is further based on an output of the lookup table.

11. The control system of claim 1 wherein the gaseous-fueled engine comprises a gaseous-fueled mobile industrial equipment engine.

12. The control system of claim 11 wherein the gaseous-fueled mobile industrial equipment engine comprises a forklift engine.

13. A control system for controlling an air/fuel ratio in gaseous-fueled engine comprising:
    a valve having an outlet port in fluidic communication with an air inlet of a fixed venturi mixer;
    a fuel vaporizer/regulator having an outlet port in communication with a fuel inlet of the fixed venturi mixer;
    a mechanism for sensing differential pressure between the air inlet and the fuel inlet; and
    a control module adapted to move the valve to a position such that the differential pressure is within a tolerance band of a set point.

14. The control system of claim 13 wherein the mechanism for sensing differential pressure comprises a differential pressure sensor.

15. The control system of claim 14 wherein the differential pressure sensor comprises a first pressure sensor between the outlet port of the valve and the air inlet of the fixed venturi mixer and a second pressure sensor between the outlet port of the fuel vaporizer/regulator and the fuel inlet of the fixed venturi mixer.

16. The control system of claim 13 wherein the mechanism for sensing differential pressure comprises an estimator that estimates the differential pressure based on air flow to the air inlet of the fixed venturi mixer and the position of the valve.

17. The control system of claim 13 wherein the fuel vaporizer/regulator comprises a negative outlet pressure fuel vaporizer/regulator.

18. The control system of claim 13 further comprising an air filter in fluidic communication with an inlet port of the valve.

19. The control system of claim 13 wherein the set point is zero.

20. The control system of claim 13 wherein the set point is biased by an output of an outer control loop.

21. The control system of claim 13 wherein the gaseous-fueled engine comprises a gaseous-fueled mobile industrial equipment engine.

22. The control system of claim 21 wherein the gaseous-fueled mobile industrial equipment engine comprises a forklift engine.

* * * * *